United States Patent [19]

Ino et al.

[11] Patent Number: 4,977,304

[45] Date of Patent: Dec. 11, 1990

[54] LINEAR SOLID STATE IMAGE SENSOR

[75] Inventors: Masumitsu Ino, Yokohama; Mitsuhiro Kohata, Natori; Masanori Itagaki, Yokohama; Takehito Nagata, Yokohama; Hiroyuki Tanaka, Yokohama, all of Japan

[73] Assignees: Ricoh Company Ltd., Tokyo; Ricoh Research Institute of General Electronics Co., Ltd., Natori, both of Japan

[21] Appl. No.: 475,800

[22] Filed: Feb. 6, 1990

[30] Foreign Application Priority Data

Feb. 9, 1989 [JP] Japan .................................. 64-28600
Jul. 28, 1989 [JP] Japan ................................. 64-194303

[51] Int. Cl.⁵ ........................................... H01J 40/14
[52] U.S. Cl. .................................... 250/208.1; 357/30
[58] Field of Search ............................ 250/208.1, 578; 357/30 D, 30 H, 30 Q; 358/482, 483

[56] References Cited

U.S. PATENT DOCUMENTS 4,450,466  5/1984  Nishizawa et al. ............... 357/30 D
4,876,585  10/1989  Ozawa .............................. 250/208.1

Primary Examiner—David C. Nelms
Assistant Examiner—Que Tan Le
Attorney, Agent, or Firm—Oblon, Spivak, McClelland, Maier & Neustadt

[57] ABSTRACT

A linear solid-state image sensor includes a first chip and a second chip, each of the first and second chips having a long substrate, a plural number of photo-responsive elements formed in a line on the substrate, an analog switch circuit driving the photo-responsive elements, and a shift register shifting signal to make the analog switch circuit successively effective. The second chip is mechanically connected to the first chip so that a shift direction of the shift register circuit is in agreement with a shift direction of the shift register circuit of the first chip. The linear solid-stage image sensor further includes an external wiring connecting a first stage of the shift register circuit of the first chip and a final stage of the shift register circuit of the second chip, and an input wiring being formed on the substrate of the second chip and leading signal input from the terminal at the end of the side opposite a connection portion with the first chip to a first stage of the shift register circuit of the second chip.

16 Claims, 17 Drawing Sheets

1ST CHIP (CHIP 34-1)

1ST CHIP (CHIP 34-1)

LINEAR SOLID STATE IMAGE SENSOR

BACKGROUND OF THE INVENTION

The present invention relates to a solid state image sensor, and more particularly, to a linear solid state image sensor in which photo-responsive elements that optically read an image on an original, for example, are disposed in linearly.

Image processing apparatus such as facsimile apparatus and digital copy machines and the like have linear solid state image sensors as the image input devices for example. A contact type image sensor is configured so that the surface of the sensor is in close contact with the original, and therefore do not require an optical system for image focusing. This contact type image sensor has the characteristic of being able to read images on an original at full size. Of the various types of the contact type image sensor, the completely contact type image sensor does not require a gradient index lens placed between the original and a photo-responsive element array (hereinafter termed an element array) to lead the light, and the element array can be in direct contact with the original. Accordingly, this completely contact type image sensor has the advantage in which an entrance mechanism to lead the light reflected by an original to the element array can be made smaller.

Linear solid state image sensor (such as disclosed in Japanese Patent Laid Open No. 288668-1986) that can read images on an original at full size have been conventionally used. This solid state image sensor has a bi-directional shift register of which read out direction can be selected in one direction. Because of this bi-directional shift register, it is possible successively to read signal output from all photo-responsive elements and it is not necessary to rearrange the signals and also, it is possible to read an image of large area at high speed.

In addition, Japanese Patent Laid Open No. 253972-2986, discloses a solid state image sensor comprising a pair of sensor elements. In this solid-state image sensor, the wiring drawn from the bonding terminal of one pair of sensor elements to a board of the solid-state image sensor is disposed with mirror symmetry. Whereby, it is possible to have a high S/N ratio. Moreover, Japanese Patent Laid Open No. 231757-1986 discloses a solid-state image sensor in which a plural number of chips are disposed. In this solid-state image sensor, when these chips are adhered, the disposition is such that the adhesion surface forms an angle which is not perpendicular to the sensor surface. Whereby, there is an outlet for the adhesive to escape and random light reflection from the contact portion is reduced. Such a solid-state image sensor is disclosed in Japanese Patent Laid Open No. 234562-1986. Furthermore, Japanese Patent Laid Open No. 131860-1983, Japanese Patent Laid Open No. 97267-1984, Japanese Patent Laid Open No. 86963-1985 and the Electronic Information & Communications Association Technical Report ED-161 disclose a solid-state image sensor of which two chips is connected so as to form a linear sensor. In each of these disclosures is described a signal compensation method for the connector portion of the chips.

In particular, the solid-state image sensors disclosed in Japanese Patent Laid Open No. 28868-1986 and Japanese Patent Laid Open No. 253972-1896 use a bi-directional shift register that is selective in one direction. In this solid-state image sensor, it is necessary to enable data transmission at the contact portion of the two chips. Normally, the shift register has wiring for power supply, wiring for control signals and wiring for data input. In the entirety of a solid-state image sensor, in addition to this wiring, there is also power supply wiring for full-size sensors and wiring for image signal output. However, in the already mentioned prior art, not sufficient attention has been paid for the various influences that these wiring have. Taking out wires from the unit by wire bonding or the like and the existence of wiring pads therefor increase the number of manufacturing processes and the substrate area necessary. Whereby, when the completely contact type of full-size image sensor is designed, it becomes more difficult to make the unit compact and to reduce the price.

The solid-state image sensors disclosed in Japanese Patent Laid Open No. 231757 and No. 234562-1986 have elements such as a thin-film transistor and a photo-responsive element formed in the vicinity of a chip contact portion. However, in this case, there is no consideration for the possibility of damage to the element at the chip cutoff portion. When the two chips are connected, the connection surface is formed by cutting off that contact portion. There is no consideration for the influence of mechanical stress to which the elements are subject and destruction due to the mechanical stress on the characteristics of individual elements.

FIG. 1 indicates a basic configuration of a linear solid-state image sensor.

A linear solid-state image sensor 10 has a substrate 34 of quartz or some other material which is optically transparent. On this substrate 34 are formed an element array 11 in which photo-responsive elements are disposed linearly, and a drive circuit 12 formed from a thin-film transistor (TFT) provided so as to correspond with each of the photo-responsive elements of the element array 11. The drive circuit 12 has a structure with an analog switch 22 and a shift register 28.

The linear solid-state image sensor 10 scans a wide area at once. Accordingly, it is desirable that the linear solid-state image sensor 10 is as long as possible.

However, from the viewpoint of manufacturing technology, it is difficult to form the element array 11 in a uniform state on the long substrate 34.

Accordingly, in considering the manufacturing yield and the dimensional rating of the currently existing manufacturing apparatus, when a long linear solid-state image sensor 10 is manufactured, it is the best process to connect a plural number of short image sensors in order to create the linear solid-state image sensor 10.

FIG. 2 indicates a conventional solid-state image sensor in which two image sensors are connected.

A first image sensor (hereinafter known as the first chip 34-1) and a second image sensor (hereinafter known as the second chip 34-2) are connected at their end surfaces and in the direction of their length. The first chip 34-1 and second chip 34-2 have a structure whereby a element array 11 and drive circuit 12 are formed on the substrate 34, as indicated in FIG. 1. The surface of the first chip 34-1 and the second chip 34-2 in the vicinity of the connection portion 58 of the first chip 34-1 and second chip 34-2, has pads 36-1a, 36-1b, 36-2a and 362b formed upon it. These pads 36-1a, 36-1b, 36-2a and 36-2b are connected by wires 40 which are bonded.

These wires 40 are the data transfer wires, the power wires and the control signal wires connecting the first chip 34-1 and second chip 34-2.

In addition, the protector glass 38 is provided on the chips 34-1, 34-2.

In a linear solid-state image sensor 10 having a structure such as has been described above, there are also provided in the center, parts for the connection of the pads and wires to the chip. Accordingly, it is necessary to reserve an extra area for the sake of connection to the chip and the extra area necessary creates problems for making the entire sensor more compact.

In addition, when the linear solid-state image sensor 10 is applied to an image processing apparatus 100 such as indicated in FIG. 3, an solid-state image sensor 10 of the completely contact type is used. A protector glass 38 provided on the first chip 34-1 and the second chip 34-2 protects the image sensor from dust and static electricity that is generated by original 102 as it runs between the contact roller 104 and the paper guide 106 of the image processing apparatus 100. In the sensor of the completely contact type, image forming optical system elements are not used and the original 102 is slided on the element array 11 and the image information is directly read by the element array 11. However, in a conventional solid-state image sensor as indicated in FIG. 2, the wire 40 can be damaged by the protector glass 38.

SUMMARY OF THE INVENTION

Accordingly, it is a general object of the present invention to provide a novel and useful linear solid-state image sensor in which the problems described heretofore are eliminated.

A further object of the present invention is to provide a linear solid-state image sensor which is compact and which has excellent device characteristics and which also has a small number of manufacturing processes.

The above objects of the present invention can be achieved by a linear solid-state image sensor comprising a first chip having a long substrate, a plural number of photo-responsive elements formed in a line on the substrate along the direction of the length thereof, an analog switch circuit driving the photo-responsive elements, the analog switch being formed on the substrate, and a shift register shifting signal to make the analog switch circuit successively effective, the shift register being formed upon the substrate, a second chip having, in the same manner as the first chip, a long substrate, a plural number of photo-responsive elements formed in a line on the substrate along the direction of the length thereof, an analog switch circuit driving the photo-responsive elements, the analog switch being formed on a substrate, and a shift register shifting signal to make the analog switch circuit successively effective, the shift register being formed upon the substrate, the second chip being mechanically connected to the first chip so that a shift direction of the shift register circuit being in agreement with a shift direction of a shift register circuit of the first chip, external wiring connecting a first stage of the shift register circuit of the first chip and a final stage of a shift register circuit of the second chip, and input wiring being formed on the substrate of the second chip and leading signal input from the terminal at the end of the opposite a connection portion with said first chip to a first stage of the shift register circuit of the second chip.

Furthermore, other objects and characteristics of the present invention will become apparent from the following description and the appended drawings.

BRIEF DESCRIPTION OF THE DRAWINGS

FIG. 29 through FIG. 32B are views indicating the effect of the data input stabilization circuit.

DESCRIPTION OF THE PREFERRED EMBODIMENT

The following is a description of a embodiment of the solid-state image sensor according to the preset invention.

Figure 4:
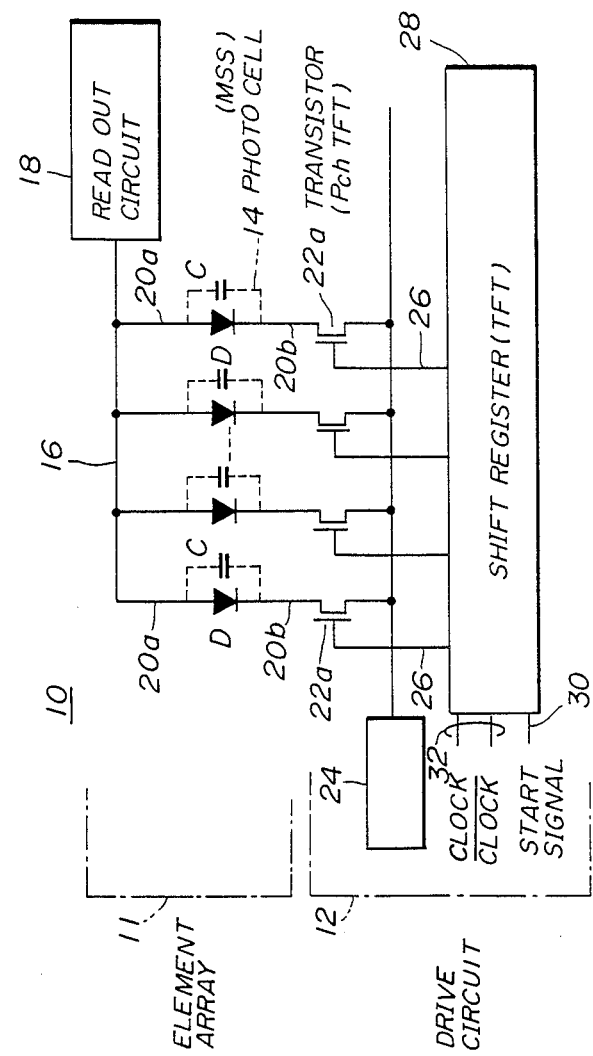
FIG. 4 is a view indicating a circuit configuration of a linear solid-state image sensor.

FIG. 4 shows the circuit configuration of a solid-state image sensor 10. As has already been described, an linear solid-state image sensor 10 has a drive circuit 12 and an element array 11 formed on a substrate 34.

The element array 11 has a plural number of photo-responsive elements which are photo-cells 14 arranged in a line. These photo-cells 14 are formed with a metal-semi-insulator-semi-insulator (MSS) structure and the photo-cells 14 have a photo-diode D (which receives light which has been reflected from an original, and for which the status for the conductivity changes in accordance with the amount of light received), and a connection capacitance C. One of the electrodes of each of the photo-cells 14 is connected to read output wiring 16. The read output wiring 16 is connected to a read circuit 18. The read circuit 18 converts the current that is input via the read output wiring 16, into corresponding voltages and these voltages are integrated. Then, the read circuit 18 forms the image signals in accordance with the integrated values.

The other electrodes of the photo-cells 14 are connected to a source drain circuit of transistors 22a that configures a plural number of corresponding analog switches. The transistors 22a are P-channel thin-film transistor in the present embodiment. The other ends of the source drain channels of each of the transistors 22a are connected to a power source 24. The control electrodes 26 of the transistors 22a are also connected to a shift register circuit 28 that also comprises thin-film transistors. The shift register circuit 28 has a data input terminal 30 and clock terminals 32. When data is input as start signal from the data input terminal 30, shift register circuits 28 successively shift that data in synchronization with the clock from clock terminals 32.

Each of the transistors 22a in the analog switch 22 are successively driven by data (start signals) that are successively shifted inside shift register circuit 28. This shift register circuit 28 and analog switche 22 form a TFT drive circuit 12.

Figure 5:
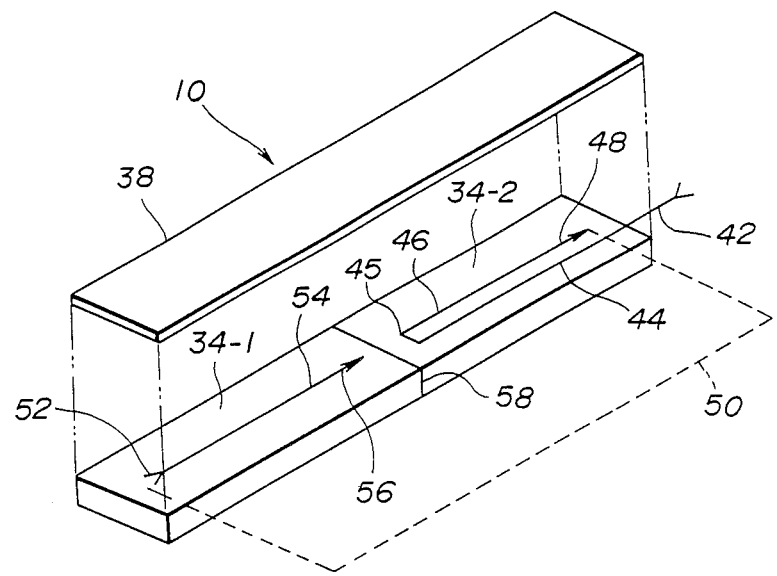
FIG. 5 is a view indicating an example of a conceptual structure of a linear solid-state image sensor according to the present invention.

FIG. 5 indicates the conceptual structure of a linear solid-state image sensor 10 of the completely contact type and according to the present invention.

Figure 1:
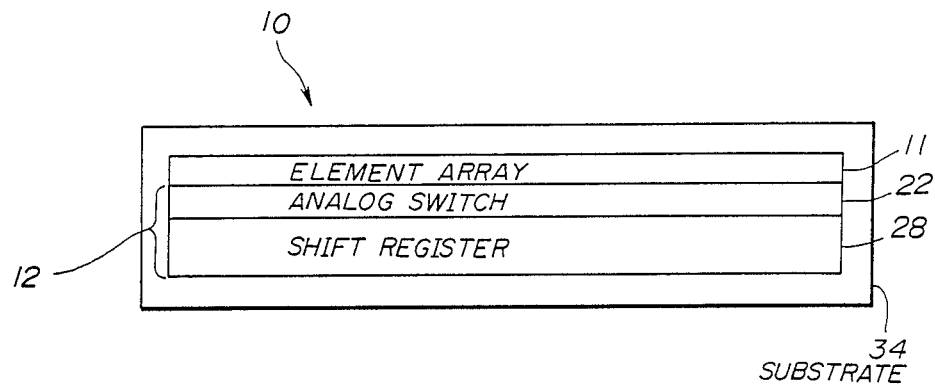
FIG. 1 is a view indicating the arrangement of the element array, the analog switch and the shift register circuit on the substrate.
Figure 2:
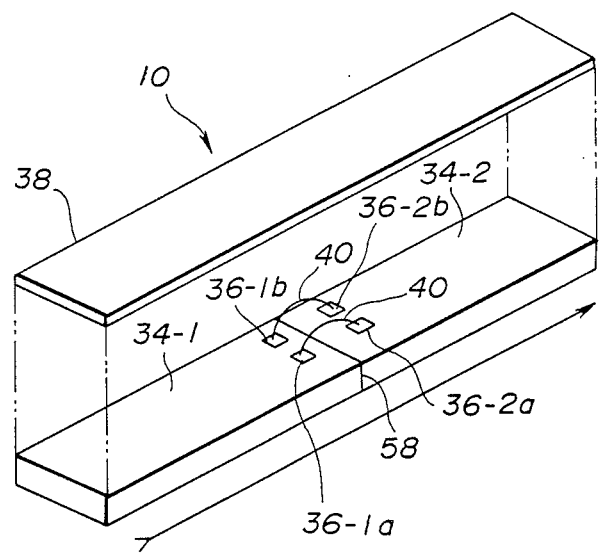
FIG. 2 is a view indicating the configuration of a conventional solid-state image sensor.

In the same manner as in FIG. 2, this linear solid-state image sensor 10 has a first chip 34-1 and a second chip 34-2. However, the wires 40 which cross over the connection portion 58 of the first chip 34-1 and second chip 34-2 is removed. Data transfer is independently performed for both first chip 34-1 and second chip 34-2.

The first chip 34-1 and second chip 34-2 are mechanically connected. These are connected by adhesive, for example. The direction of the shift of the data of the shift register circuit 28 in the first chip 34-1 is in the direction from the opposite end of the connection portion 58 to the connection portion 58 (indicated by arrow 54). The direction of the shift of the data of the shift register circuit 28 in the second chip 34-2 is in the direction from the connection portion to the opposite end thereof (indicated by arrow 46). The opposite end portion of connection portion 58 in the second chip 34-2 is provided with an input terminal 42. The surface of the second chip 34-2 has a data input wiring 44 formed in the direction along the length of the second chip 34-2. One end of this data input wiring 44 is electrically connected to the input terminal 42. External data (start data) from a input terminal 42 is supplied to an initial stage 45 of the shift register circuit 28 via the data input wiring 44. The data input to the initial stage 45 of the shift register circuit 28 is successively shifted through each of the stages as indicated by arrow 46. The data that has reached the final stage of the shift register circuit 28 is output to an external connection line 50.

This external connection line 50 is indicated by a dotted line in FIG. 5 and is a connection line provided external to first chip 34-1 and second chip 34-2. The external connection line 50, for example, is formed by the printed pattern on the printed circuit board. The other end of the external connection line 50 is connected to an input terminal 52 of a shift register circuit 28 in the first chip 34-1. The data supplied to this input terminal 52 from the external connection line 50 is successively shifted in the direction of the arrow 54, from the initial stage of the shift register circuit 28. Data that has reached the final stage is discharged externally from an output terminal 56.

Figure 6:
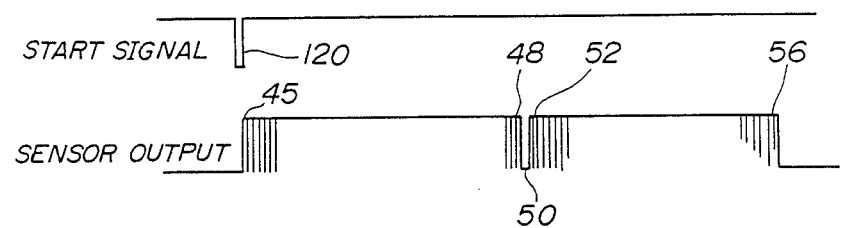
FIG. 6 is a view indicating the status of signals of each portion of the image sensor.

Because of the wiring connections indicated in FIG. 5, the data from the input terminal 42 of the first chip 34-1, is successively shifted inside the shift register circuit 28 of the first and the second chips 34-1, 34-2 and is output from the output terminal 56 of the second chip 34-2. The status of this shift operation is indicated in the timing chart in FIG. 6. In the timing chart in FIG. 6, the signals to each portion of the chip have reference numbers appended to each of the portions so as to correspond to the timing that occurs.

In the process where the shift operation described above is repeated, timing control is performed so that the signals output from the element array 11 of the second chip 34-2 are output after the signals output from the element array 11 of the first chip 34-1. Whereby, the element arrays 11 on the first chip 34-1 and second chip 34-2 function as a single long element array 11.

The first chip 34-1 and the second chip 34-2 are mechanically connected. However, the wiring electrically connecting the first chip 34-1 and the second chip 34-2 is not formed in the central portion of the image sensor with a connection portion 58 for each chip.

The electrical wiring is connected to the external connection line 50 in the outer terminal portion of the first chip 34-1 and the second chip 34-2.

Figure 3:
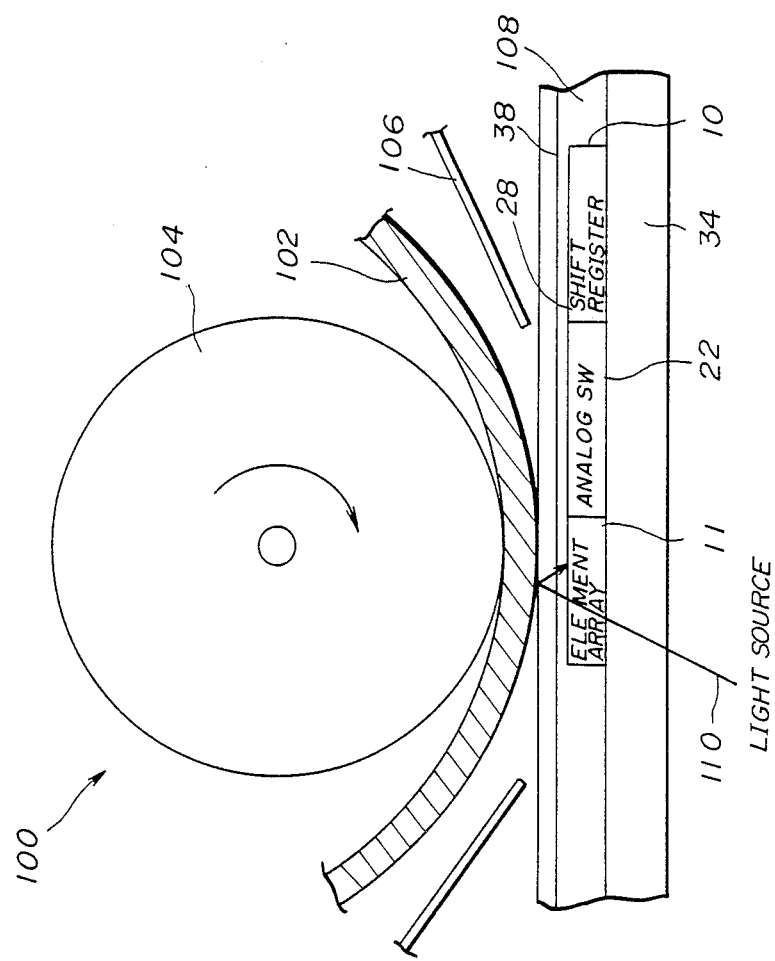
FIG. 3 is a view indicating the status where a completely contact image sensor is applied to an image processing apparatus.

FIG. 3 shows the configuration when the linear solid-state image sensor 10 described above, is configured as a completely contact type of sensor. An adhesion layer 108 formed on a substrate 34 (including first chip 34-1 and second chip 34-2) adheres a protector glass 38 to a substrate 34. Light 110 from a light source is reflected by the surface of an original 102 transported while in contact with the surface of the protector glass 38. Then, in the status where that reflected light is directly input to the element array 11, each of the photo-cells 14 of the element array 11 is successively driven to scan of the original. This linear solid-state image sensor 10 is not adversely influenced by the electrical wiring when the original is pressed against it because there is no electrical wiring in the central portion even for the completely contact type.

Figure 7:
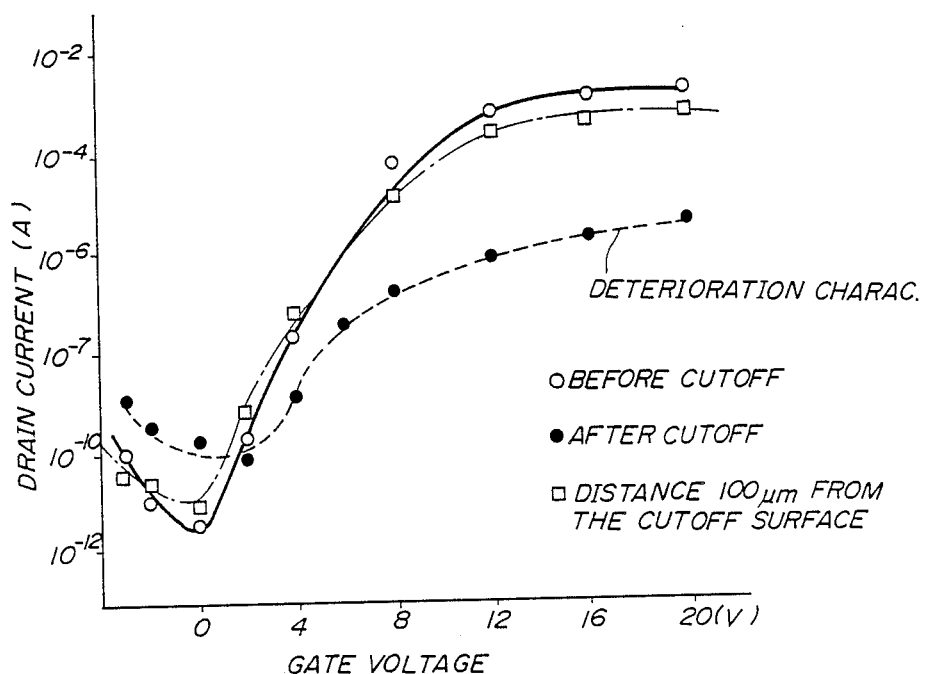
FIG. 7 is a view indicating that characteristics of a TFT in the vicinity of the cutoff portion of the chip.
Figure 8:
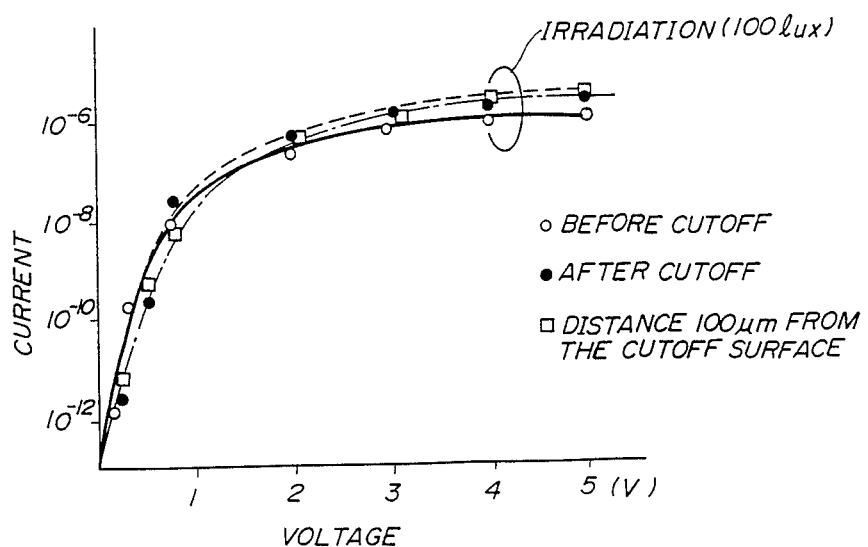
FIG. 8 is a view indicating the characteristics of an element array in the vicinity of the cutoff portion of the chip.

The analog switch 22 and the shift register circuit 28 are formed on the substrate of the linear solid-state image sensor 10. This analog switch 22 and shift register circuit 28 form a structure whereby thin-film transistors are disposed. The electrical characteristics of thin-film transistors positioned in the vicinity of a cutoff surface of the substrate 34 are deteriorated. FIG. 7 indicates the status for this deterioration of characteristics. In FIG. 7, the "o" mark represents the characteristics before cutoff, the "●" mark represents the characteristics of a thin-film transistor after cutoff and the "□" mark represents the characteristics of a thin-film transistor 100 μm remote from the cutoff surface. In addition, it is difficult for the photo-cells 14 forming the element array 11 formed on the substrate 34 to receive the influence of the cutoff surface of the substrate as is the case for thin-film transistors. FIG. 8 indicates the electrical characteristics of the photo-cells 14 when there an illumination of 100 lux is irradiated. In FIG. 8, the "o" mark represents the electrical characteristics of the a photo-cell 1 before cutoff, the "●" mark represents the characteristics of a thin-film transistor after cutoff and the "□" mark represents the characteristics of a thin-film transistor 100 μm remote from the cutoff surface.

Figure 9:
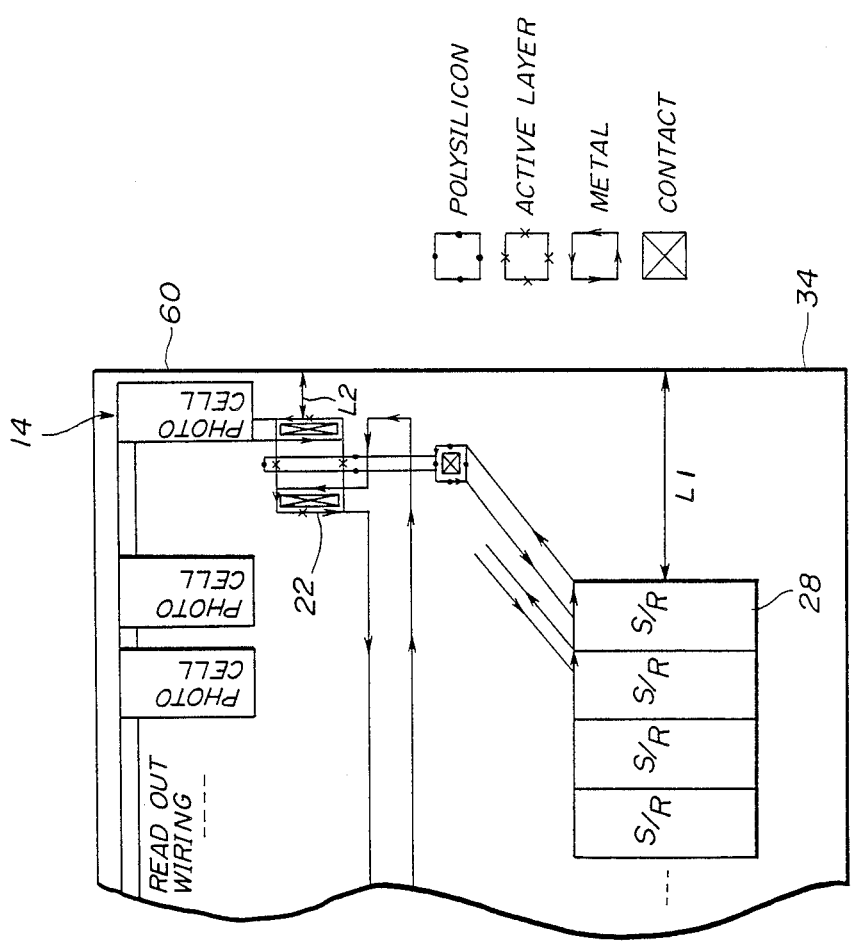
FIG. 9 is a view indicating the disposition of each of the elements in the vicinity of the cutoff portion of the chip.

Because of the characteristics of the thin-film transistor described above, the shift register circuit 28 and the analog switch 22 configured with the thin-film transistor is configured at a predetermined distances L1 and L2 from the cutoff surface 60 of the substrate 34, as indicated in FIG. 9. From the characteristics given in FIG. 7, these predetermined distances L1 and L2 can be each less than approximately 100 μm, for example. When a thin-film transistor is formed remote from the cutoff surface 60 in this manner, there is no deterioration of the characteristics. Accordingly, misoperation during data transfer and delays in the data transfer speed can be prevented. In addition, the characteristics of the photo-cells 14 which is not susceptible to the influence of the cutoff surface enables the element array 11 configured from the photo-cells 14 to be formed in the vicinity of the cutoff surface of the substrate 34. This is to say that the interval between the final stage photo-cell 14 of the first chip 34-1 and the initial stage photo-cell of the second chip 34-2 can be made smaller. Accordingly, the fallout of the image due to the position with respect to the connection portion 58 between the first chip 34-1 and the second chip 34-2 can be held to a minimum.

Figure 10:
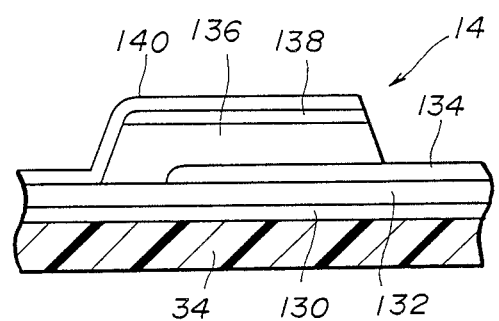
FIG. 10 is a view indicating the sectional structure of a photo-cell.

FIG. 10 indicates the sectional structure of a photo-cell 14.

A $Si_3N_4$ protector layer 130 is formed on a quarts substrate 34. A $SiO_2$ insulating layer 132 is formed on the $Si_3N_4$ protector layer 130. On top of the insulating layer 132 are laminated a Cr metal electrode 134, an amorphous silicon film a—SiH 136 which is the active layer, and an a—SiOH film 138 and on the SiOH film 138 is formed a transparent electrode (ITO) 140, as indicated in the FIG. 10.

Figure 11:
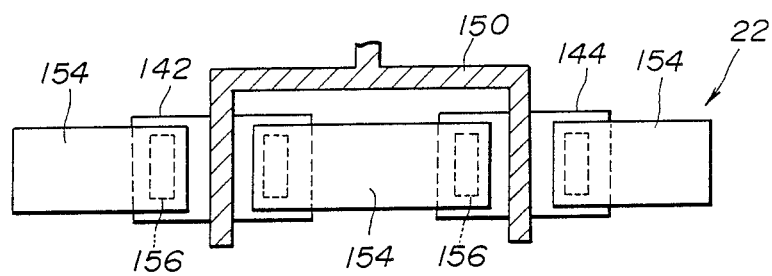
FIG. 11 is a plan view indicating the structure of a CMOS inverter.
Figure 12:
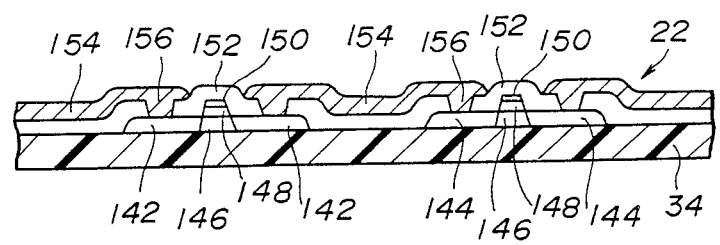
FIG. 12 is a view indicating the sectional structure of a CMOS inverter.

The planar structure of the thin-film transistor is indicated in FIG. 11, and the sectional structure is indicated in FIG. 12.

On the substrate 34 are formed a polysilicon p+dispersion layer 142 and the polysilicon n+dispersion layer 144. A polysilicon active layers 146 is formed in the p+dispersion layer 142 and n+dispersion layer 144. On top of these active layers 146 are laminated either a gate oxide film 148 and gate electrode 150 formed of phosphorous or boron doped polysilicon. These active areas are covered by a protector film 152 of PSG or $SiO_2$. The dispersion layers 142 and 144 are connected to a metal electrode 154 formed of aluminum or the like by a contact 156.

Each of the transistors 22a of the analog switch 22 are connected to a power source 24, as indicated in FIG. 4. Each of the transistors 22a and the power source are connected by wiring formed by a conductive wire the same as the metal electrode 154. The conductor metal that is actually used as the wiring material is aluminum with a specific resistance of 0.0006 Ωcm. The resistance of this wiring causes a drop in the voltage and the amount of this drop in the voltage is dependent upon the length of the wiring from the power source 24. This voltage drop causes the voltage supplied to the transistor 22a configuring the analog switch 22 to change in accordance with the distance from the power source 24 and is no desirable since it is no possible to have the same output from the analog switch 22.

Figure 13:
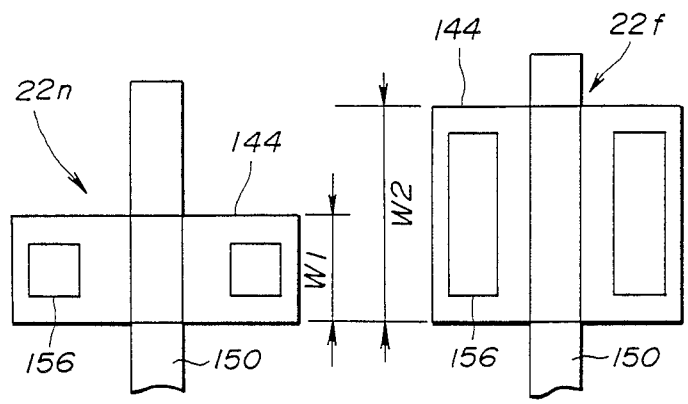
FIG. 13 is a view indicating the channel status of an analog switch in a position remote from the power source and the channel status of an analog switch in a position in the vicinity of the power source.
Figure 14:
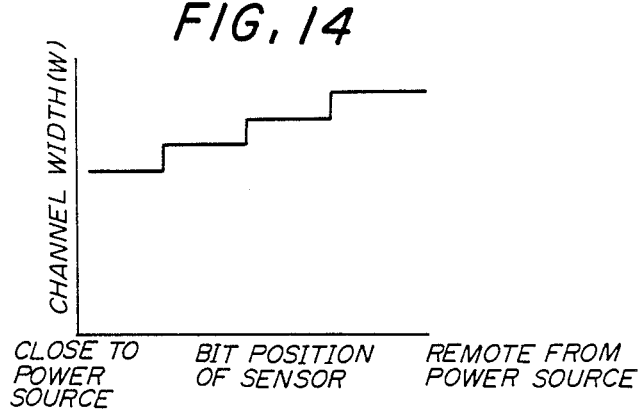
FIG. 14 and FIG. 15 are views indicating the status of an output current and a distribution of the channel width of an analog switch.
Figure 15:
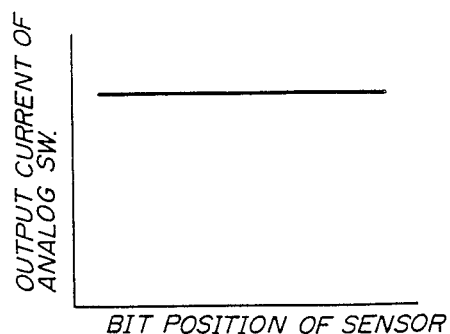

With respect to this, in the present embodiment, the shape of the thin-film transistor is changed to correspond to the distribution of the wiring resistance. Accordingly, the output current of the analog switch 22 becomes a value within a predetermined allowable range, not depending upon the position. More specifically, as indicated in FIG. 13, the width of a channel W1 of a thin-film transistor 22a close to the power source 24 is less than the width of a channel W2 of a thin-film transistor 22b remote from the power source 24. That is say, as indicated in FIG. 14, that the channel width of the thin-film transistor is changed depending on the distance from the power source 24 namely bit position of the element array 11. Accordingly, as indicated in FIG. 15, the output current from the analog switch 22 becomes uniform.

In this manner, the output current from the analog switch 22 is made stable and so the read time of the element arrays 11 becomes uniform. Therefore, the circuit configuration of the read circuit 18 to which the signals from the element array 11 are input, becomes simple and the number of processes required for the fine adjustment of each of the elements in the process of manufacture becomes fewer.

The following is a description of a linear solid-state image sensor relating to another embodiment according to the present invention, with reference to FIG. 16 through FIG. 32B.

Figure 16:
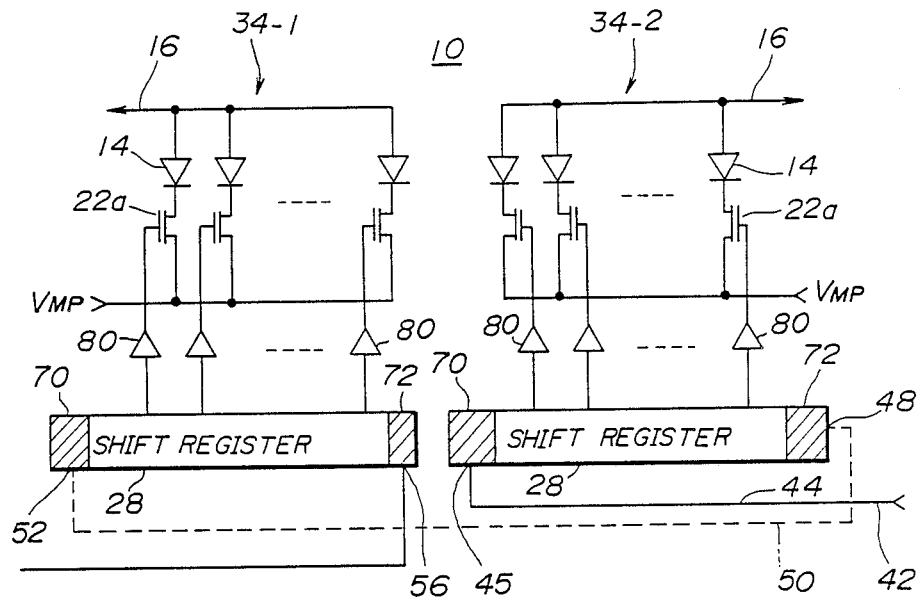
FIG. 16 is a view indicating an example of a circuit configuration of the linear solid-state image sensor according to the present invention.

FIG. 16 indicates the overall circuit configuration. In FIG. 16, parts that are similar to parts indicated in FIG. 4, are indicated with the same numbers.

The first chip 34-1 second chip 34-2 are provided with data input stablization circuit 70 at the input stage of their shift register circuit 28, and with data output circuits 72 at the output stage of their shift register circuits 28. The data input stablization circuit 70 is a circuit to prevent the waveforms of the input signal to the shift register rounding because of the resistance and the capacitance in the external connection line 50 and the data input terminal wire 44. The data output circuit is a circuit to shape the waveform of output data from the shift register, to compensate the timing lag of the output data and to transfer the appropriate data. Either of the data input stabilization circuit 70 or the data output circuit may be provided to each of the chips 34-1, 34-2. In addition, both of the circuits 70, 72 may be provided to both or each of the chips first chip 34-1 and second chip 34-2. Alternatively, both can be provided in the second chip 34-2, in particular.

Figure 17:
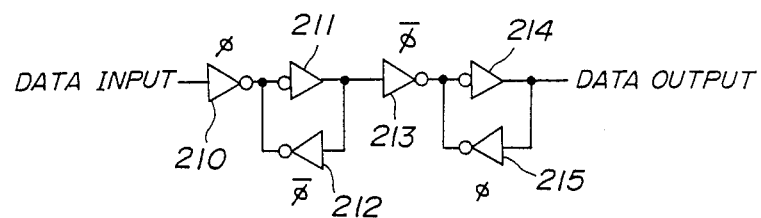
FIG. 17 and FIG. 18 are views indicating the circuit configuration of a shift register.

When data is input to the shift register circuit 28, for example the capacitance and resistance in the long wiring 44 causes the input timing to be late and the rise and fall of the signal waveform in particular, to become rounding. This rounding of the signal can cause the signals input to the initial stage of the shift register circuit 28 to be wrongly identified as data. In addition, this signal rounding can result in the shift register no longer being possible to perform synchronized operation with the clock signal for control. Normally, the shift register circuit 28 is configured of a logic circuit such as that indicated in FIG. 17 or FIG. 18. FIG. 17 indicates an example of the configuration of a static shift register.

Figure 18:
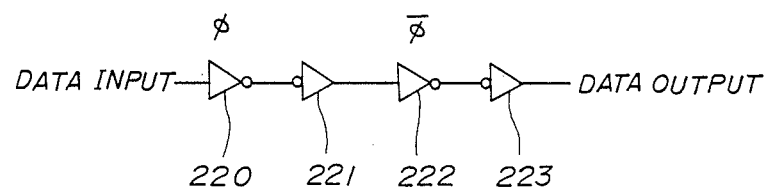
Figure 19:
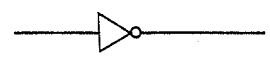
FIG. 19 is a view indicating the logic code of the inverter.
Figure 20:
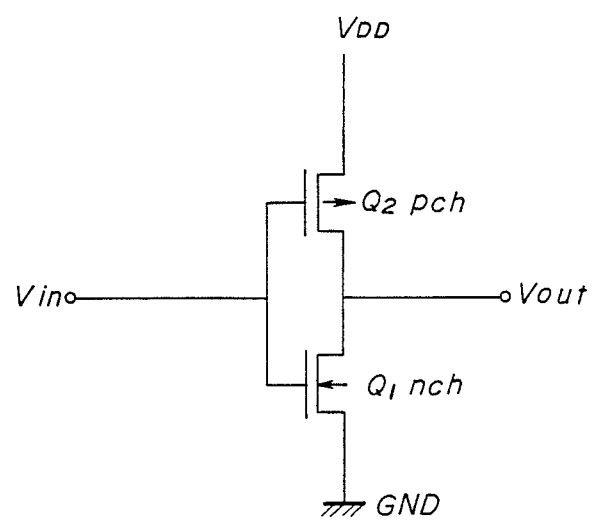
FIG. 20 is a view indicating an example of a circuit configuration of a CMOS inverter.
Figure 21:
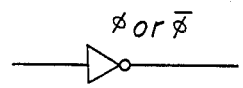
FIG. 21 is a view indicating the logic code of a clocked inverter.
Figure 22:
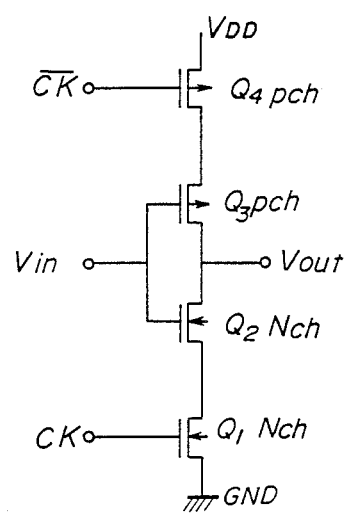
FIG. 22 is a view indicating the circuit configuration of a CMOS clocked inverter.

This static shift register has a configuration having a pre-stage having clocked inverters 210 and 212 and an inverter 211, and a post-stage having clocked inverters 213 and 215 and an inverter 214. FIG. 18 indicates an example of a configuration of a dynamic shift register. This dynamic shift register has a configuration in which clocked inverters 220 and 222 and inverters 221 and 223 are disposed alternately. These static shift inverter and dynamic shift inverter shift the data in synchronization with the two clock signals $\emptyset$ and $\bar{\emptyset}$. FIG. 19 indicates the logic code of the inverter. As is indicated in FIG. 20, this inverter is configured from an n-channel CMOS gate $Q_1$ and a p-channel CMOS gate $Q_2$. FIG. 21 indicates the logic code of the clocked inverter. As indicated in FIG. 22, this clocked inverter is comprised of two n-channel CMOS gates $Q_1$ and $Q_2$ and two p-channel CMOS gates $Q_3$ and $Q_4$. Either of the clock signals CK or $\overline{CK}$ can be used.

In the shift register circuit 28 described above, the input timing of the data, and the rounding waveform and the control signals, that is the clock timing in particular, are all greatly influence the stability of data transfer. In the present embodiment, the input stage of the shift register circuit 28 of the second chip 34-2 is provided with a data input stabilization circuit 70 in order to prevent misoperation.

The data input stabilization circuit 70 modifies the signal of waveform that have become too rounding to be able to synchronize with the control clock signal, into suitable waveform. Accordingly, compensation for timing discrepancy is performed and the operation of the shift register circuit 28 is stabilization. By providing a data input stabilizer circuit 70, the permissible range of rounding waveforms for the data input terminal wire 44 is widened. The data input stabilization circuit 70 is effectively provided at positions where there is long wiring and where rounding signals waveforms are likely.

Figure 23:
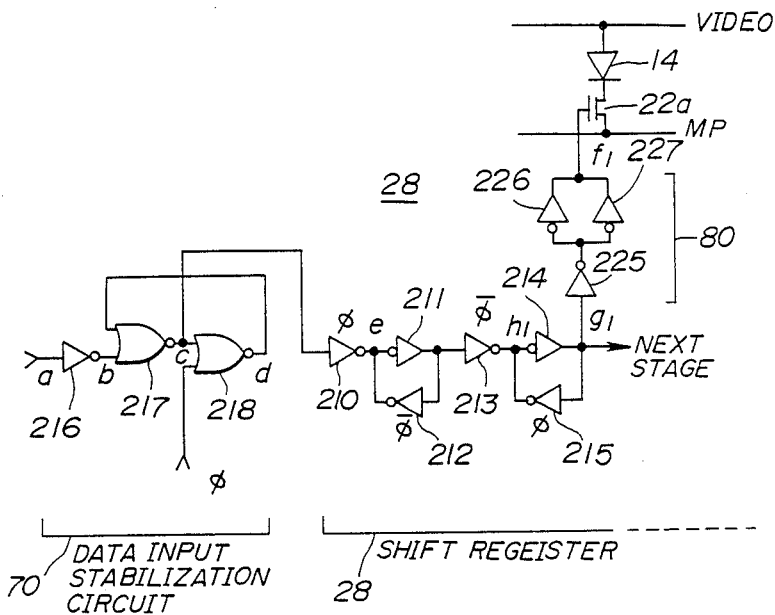
FIG. 23 and FIG. 24 are views indicating the configuration of a data input stabilization circuit.
Figure 24:
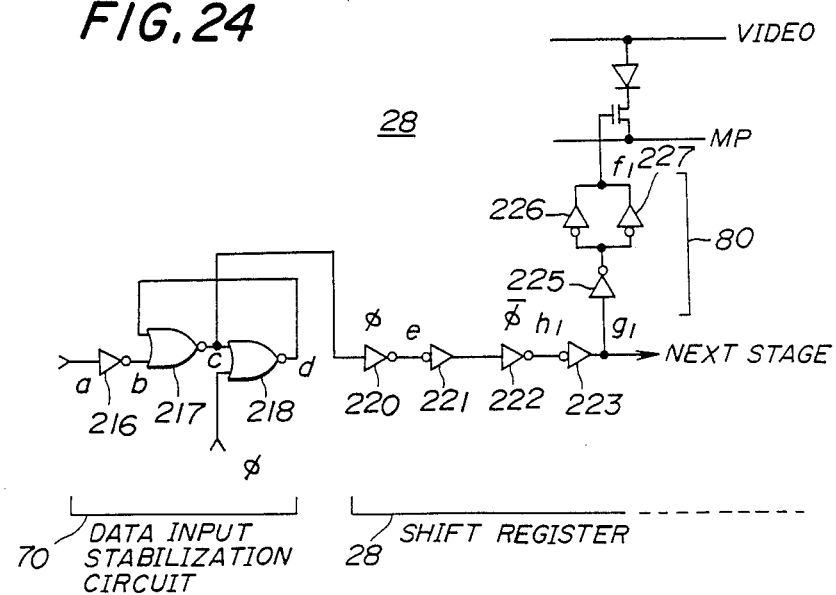

The configuration of the initial stage of the shift register circuit 28 and the data input stabilization circuit 70 is shown in FIG. 23 and FIG. 24. In FIG. 23, the configuration is shown for the case where the shift register circuit 28 is a static shift register. In FIG. 24, the shift register circuit 28 has the configuration indicated for the case where it is a dynamic shift register. The data input stabilization circuit 70 provided at the initial stage of the shift register circuit 28 comprises inverter 216, NOR gates 217 and 218 and clock $\emptyset$ is supplied to the NOR gate 218.

The output signal from each of the stages of the shift register circuit 28 are supplied to the transistor 22a of the analog switch 22 via the buffer 80, as indicated in FIG. 16. This buffer 80 compresses three inverters 225, 226 and 227, as shown in FIG. 23 and FIG. 24.

Figure 25:
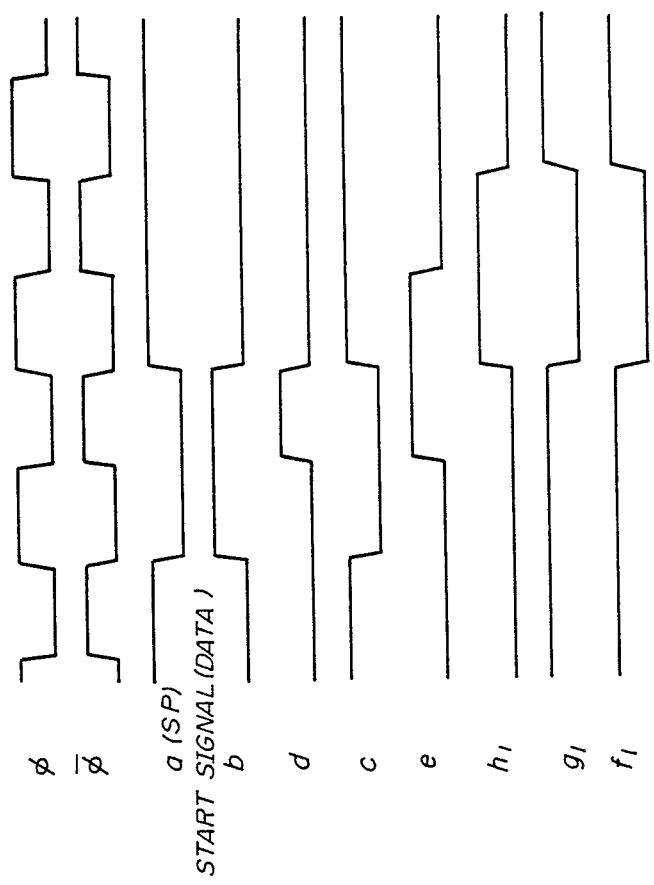
FIG. 25 is a timing chart indicating the operation of the shift register provided in the data input stabilization circuit.

The data input stabilization circuit 70 and the shift register circuit 28 indicated in FIG. 23 and FIG. 24 operates in accordance with the timing chart indicated in FIG. 25. This is to say that the start signals (a) supplied to the data input stabilization circuit 70 changes to (b), (d) and (c) in the data input stabilization circuit 70, and to (e), (h₁) and (g₁) in the shift register circuit 28 to finally become the signal (f₁). This signal (f₁) is generated at timing delayed by 1 clock from the start signal (a) and is supplied to the transistor 22a of the analog switch 22.

Figure 29:
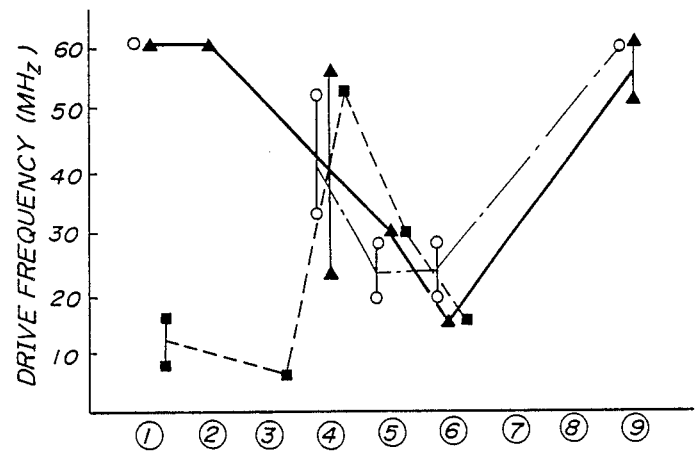
Figure 30:
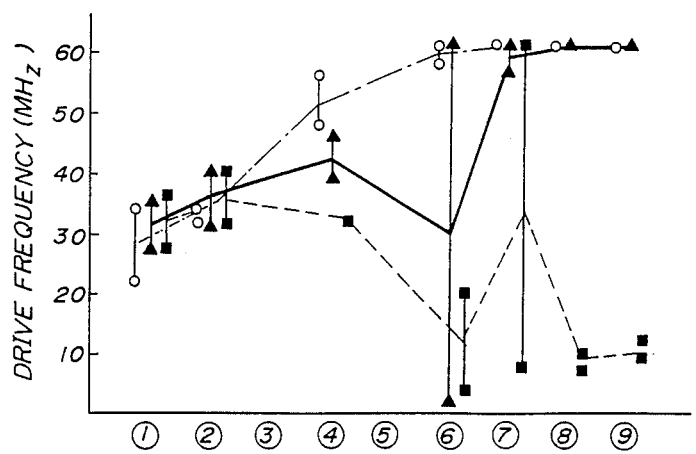

FIG. 29 and FIG. 30 illustrate the tracking characteristics with respect to the drive frequency of the shift register circuit 28 provided with the data input stabilization circuit 70 with a comparison of a conventional shift register circuit. At each of the frequencies, the "o" and "▲" marks indicate the characteristics of a shift register circuit provided with the data input stabilization circuit 70. The "■" mark indicates the characteristics of a conventional shift register circuit. In each of the figures, the numbers on the horizontal axis indicated the number of the comparison test for different samples.

In each of the comparison tests, the shift register circuit 28 provided with the data input stabilization circuit 70 is driven far more stably than the conventional shift register circuit, for even high frequencies. Normary, at high frequencies, the operation of the drive circuit is greatly influenced by the delay or rounding of the input data.

Figure 31A:
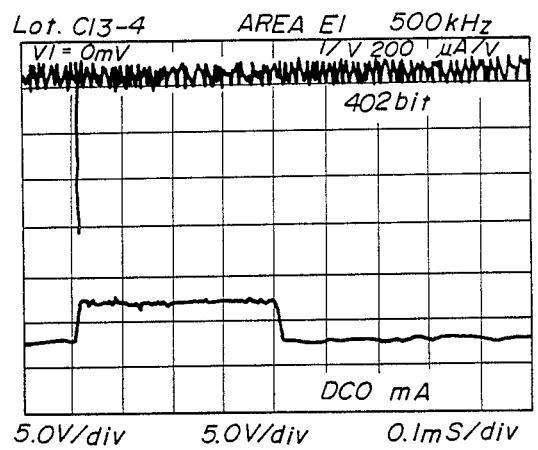
Figure 31B:
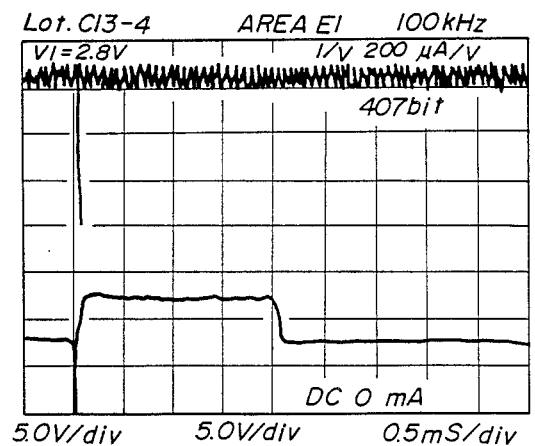

FIG. 31A and FIG. 31B indicate the degree of stability of signals with respect to the frequency of a first chip 34-1 provided with a data input stabilization circuit 70. FIG. 32A and FIG. 32B indicate the degree of stability with respect to the frequency of a second chip 34-2 provided with a data input stabilization circuit 70.

When the first chip 34-1 and the second chip 34-2 are driven at 100 KHz and 500 KHz, there are no large differences in the signal waveform for either case. Accordingly, the first chip 34-1 and the second chip 34-2 perform stable operation with respect to changes in the frequency.

The data output circuit 72 connected to the final stage of the shift register circuit 28 in the second chip 34-2 adjusts the timing of the output data. The signal for which timing adjustment has been performed by the data output circuit 72 are transferred without obstacle inside the external connection line 50 even if there is a parasitic capacitance in the external connection line 50. When the data input stabilization circuit 70 is not connected to the initial stage of the shift register circuit 28 in the first chip 34-1, it is possible to provide a waveform shaping circuit along the external connection line 50. This waveform shaping circuit inputs signal with a normal rectangular waveform, to the shift register of the first chip 34-1. In addition, the material and the shape of the wiring are determined in order to reduce the resistance and the capacitance of the external connection line 50. If the material and the shape of the wiring are determined in this manner, then the rounding of signal in the external connection line 50 will be reduced.

There is a long distance from the output terminal of the shift register circuit 28 in the second chip 34-2 and the input terminal 52 of the shift register circuit 28 in the first chip 34-1 via the external connection line 50. Accordingly, when the rounding of the signal waveform generated in this external connection line 50 exceeds the permissible range, the data input stabilization circuit 70 is provided for the initial stage of the shift register circuit 28 in the first chip 34-1. The data input stabilization circuit 70 is provided for both the first chip 34-1 and the second chip 34-2 so that the rounding of signals waveforms in the signal path from the data input terminal 42 to the initial stage of the shift register circuit 28 of the second chip 34-2 and the rounding of signal waveforms in the signal path from the output stage of the shift register circuit 28 of the second chip 34-2 to the initial stage of the shift register circuit 28 of the first chip 34-1 are rectified.

In addition, as indicated in FIG. 16, it is also possible to provide the data output circuit 72 to the final stage of the shift register circuit 28 of the first chip 34-1. The data output from this final stage is used to externally detect that the read scan at the element array 11 for each one line in the linear solid-state image sensor 10 has finished. Furthermore, if this signal is used in the process of manufacture for the linear solid-state image sensor 10, then it possible to easily test the operation of the linear solid-state image sensor 10.

Figure 26:
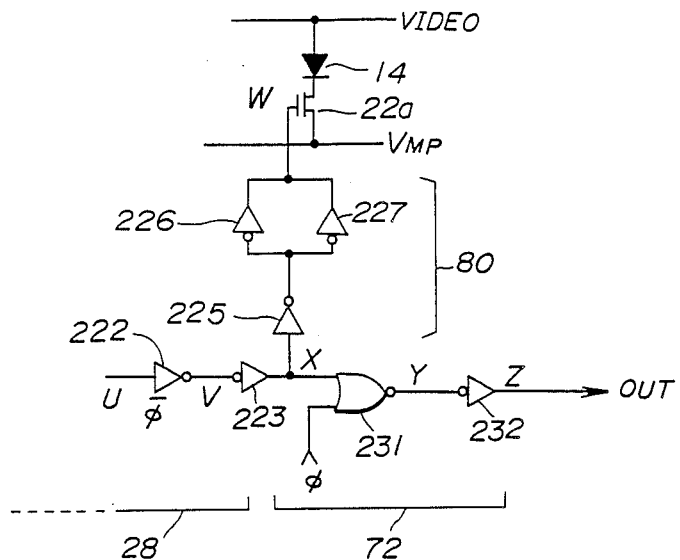
FIG. 26 and FIG. 27 are views indicating an example of a configuration of a data output circuit.
Figure 27:
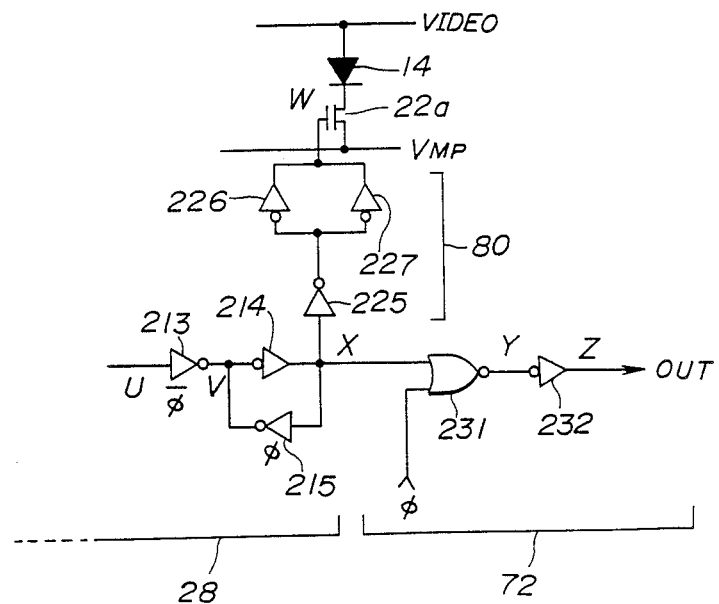

The configuration of the data output circuit 72 is indicated in FIG. 26 and FIG. 27. FIG. 26 indicates the configuration in the case where the shift register circuit 28 is a dynamic shift register and FIG. 27 indicates the configuration in the case where the shift register circuit 28 is a static shift register.

The data output circuit 72 connected to the final stage of the shift register circuit 28 comprises a NOR gate 231 and an inverter 232, and clock $\phi$ is supplied to the NOR gate 231. A buffer 80 is connected to the final stage of the shift register circuit 28 and the signals from this final stage are supplied to the transistor 22a of the analog switch 22 via this buffer 80.

Figure 28:
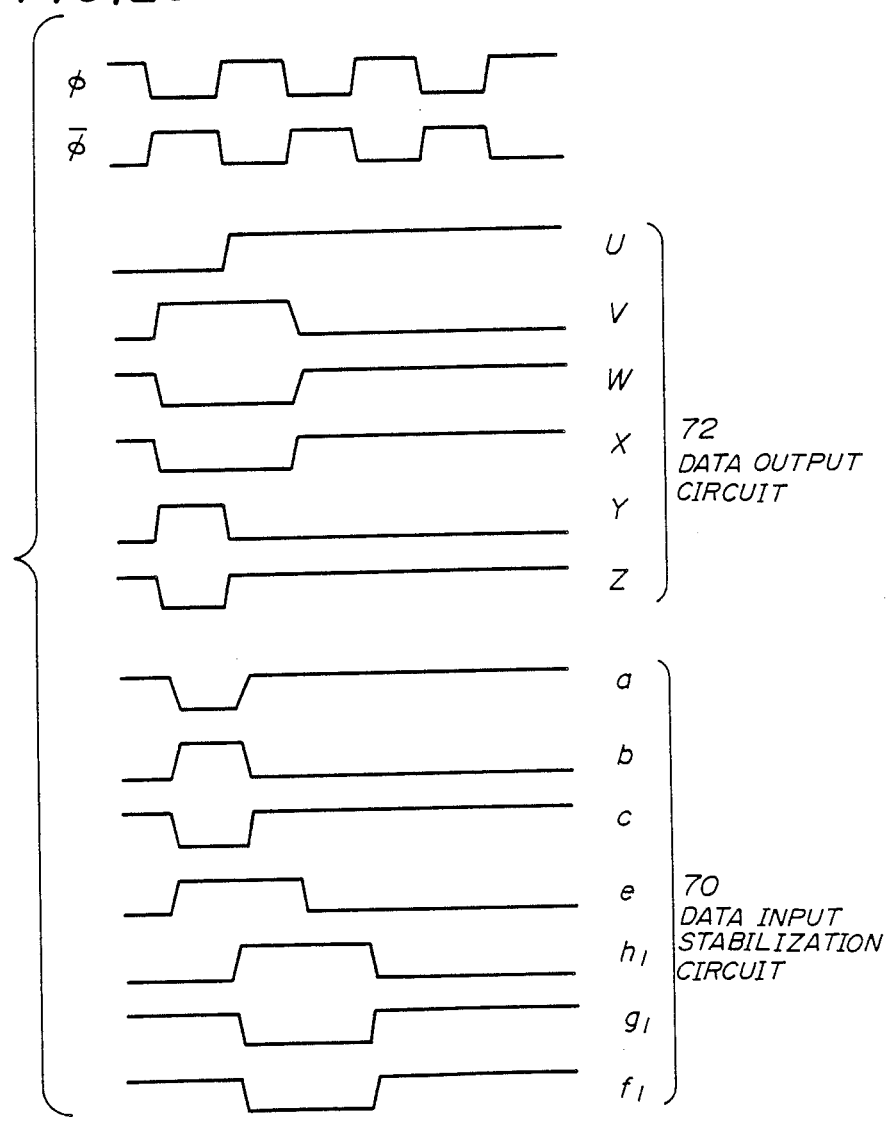
FIG. 28 is a timing chart indicating the operation of a circuit including a data output circuit and a data input stabilization circuit.

The series of operation timing of the data output circuit 72 and the data input stabilizer circuit 70 are indicated in FIG. 28.

When the signals at the final stage of the shift register circuit 28 become (u), (V) and (x), then the signal (w) is supplied to the transistor 22a of the analog switch 22. Then, the signals of the data output circuit 72 become (y) and (z). The signal (z) output from the data output circuit 72 is transferred to the data input stabilization circuit 70. At the data input stabilization circuit 70, the input signal (a) is converted in signal (c) in the same manner as indicated in FIG. 25. Then, the signal (c) passes the initial stage of the shift register circuit 28 and the buffer 80 and the signal ($f_1$) obtained is supplied to the analog switch 22.

According to the present invention, wiring for the independent transfer of drive signals is formed in respective chips that are mechanically connected to two devices chips of a linear solid-state image sensor so that it is possible to reduce the size of the apparatus without the wiring connections by wire bonding the central portions of the sensors, as in the conventional case. In addition, the two chips constructs the one image sensor and so there is a high yield for manufacture. Having no wiring wire bonded to the central portions of the image sensors so that the wire is not damaged by the protective glass being damaged by the wires. Accordingly, the present invention can be effectively applied to completely contact type sensors in particular.

The remote disposition at a predetermined distance from the connector portion of the two chips reduces the characteristics deterioration of the thin-film transistors close to the chip cutoff portion. This is to say that the characteristics of the image sensor are made more stable.

In addition, if a data input stabilization circuit is provided at an end portion of a shift register of at least one of the chips, then even if signal rounding does occur due to the wiring, then that signal will be supplied to the shift register in the state where that rounding has been rectified. Accordingly, the element array is driven definitely. Furthermore, the data output circuit is provided at an end portion at the other side of the shift register circuit so that stable shift operation is performed in the next shift register circuit even if there is a delay and a rounding in the signal due to the wiring.

Moreover, the description for specific embodiments according to the present invention is not limited to the embodiment described, but includes other modifications or changes easily accomplished by a person skilled in the art.

Furthermore, the present invention is not limited in application to solid state image sensors but is also applicable to output devices such as thermal printer heads that also have connector portions.

What is claimed is:

1. A linear solid-state image sensor, comprising:
    a first chip having a long substrate, a plural number of photo-responsive elements formed in a line on said substrate along the direction of the length thereof, an analog switch circuit driving said photo-responsive elements, said analog switch being formed on said substrate, and a shift register shifting signal to make said analog switch circuit successively effective, said shift register being formed upon said substrate,
    a second chip having, in the same manner as said first chip, a long substrate, a plural number of photo-responsive elements formed in a line on said substrate along the direction of the length thereof, an analog switch circuit driving said photo-responsive elements, said analog switch being formed on a substrate, and a shift register shifting signal to make the analog switch circuit successively effective, said shift register being formed on said substrate, said second chip being mechanically connected to said first chip so that a shift direction of said shift register circuit being in agreement with a shift direction of said shift register circuit of said first chip,
    an external wiring connecting a first stage of the shift register circuit of said first chip and a final stage of the shift register circuit of said second chip, and
    an input wiring being formed on said substrate of said second chip and leading signal input from the terminal at the end of the side opposite a connection portion with said first chip to a first stage of the shift register circuit of said second chip.

2. The linear solid-state image sensor as claimed in claim 1, wherein said analog switch is formed by thin-film transistors, and a distance from a connector portion of said first and second chips to an end point of said analog switch is greater than a distance from said connector portion to an end portion of said photo-responsive element.

3. The linear solid-state image sensor as claimed in claim 2, wherein a distance from said connector portion to the end point of said analog switch is equal or greater than 100 $\mu$m maximum.

4. The linear solid-state image sensor as claimed in claim 1, wherein said shift register circuit is formed by thin-film transistors, and a distance from a connector portion of said first and second chips to the end point of the shift register circuit is greater than a distance from said connector portion to an end portion of said photo-responsive element.

5. The linear solid-state image sensor as claimed in claim 4, wherein a distance from said connector portion to the end point of said shift register circuit is equal or greater than 100 μm maximum.

6. The linear solid-state image sensor as claimed in claim 1, wherein said analog switch and shift register circuit are formed by thin-film transistor, and each of a distance from a connector portion of said first and second chips to an end point of said analog switch and a distance from the connector portion to an end point of said sift resister circuit is greater than a distance from said connector portion to an end portion of said photo-responsive element.

7. The linear solid-state image sensor as claimed in claim 6, wherein a distance from said connector portion to the end of point of each of said analog switch and said shift register circuit is equal or greater than 100 μm.

8. The linear solid-state image sensor as claimed in claim 1, wherein said analog switch is formed by thin-film transistors, and the channel width of thin-film transistors in the vicinity of a power source is narrower than the channel width of thin-film transistors remote from a power source, so that an output current from each of the thin-film transistors to which a voltage is impressed becomes uniform.

9. The linear solid-state image sensor as claimed in claim 1, wherein said second chip has a data input stabilization circuit inputting a signal from said input wiring on said second chip, said signal being stabilized and supplied to the first stage of said shift register circuit by said data input stabilization circuit, said data input stabilization circuit being formed on said second chip.

10. The linear solid-state image sensor as claimed in claim 1, wherein said first chip has a data input stabilization circuit inputting a signal from said external wiring, said signal being stabilized and supplied to the first stage of said shift register circuit by said data input stabilization circuit, said data input stabilization circuit being formed on said first chip.

11. The linear solid-state image sensor as claimed in claim 1, wherein said second chip has a second data input stabilization circuit being formed on the substrate thereof and inputting a signal from said input wiring on said second chip, said signal being stabilized and supplied to the first stage of the shift register circuit by said second data input stabilization circuit, and said first chip has a first data input stabilization circuit being formed on the substrate thereof and inputting a signal from said external wiring, said signal being stabilized and supplied to the first stage of the shift register circuit by said first data input stabilization circuit.

12. The linear solid-state image sensor as claimed in claim 1, wherein said second chip has a data output circuit inputting a signal from the final stage of said shift register circuit, said signal being stabilized and supplied to said external wiring by said data output circuit, said data output circuit being formed on said substrate.

13. The linear solid-state image sensor as claimed in claim 1, wherein said first chip has a data output circuit inputting a signal from the final stage of said shift register circuit, said signal being stabilized and output by said data output circuit, said data output circuit being formed on said substrate.

14. The linear solid-state image sensor as claimed in claim 1, wherein said second chip has a second data output circuit inputting a signal from the final stage of said shift register circuit said signal being stabilized and supplied to said external wiring by said second data output circuit, said second data output circuit being formed on said substrate, and said first chip has a first data output circuit inputting a signal from the final stage of said shift register circuit, said signal being stabilized and output by said first data output circuit, said first output circuit being formed on said substrate.

15. The linear solid-state image sensor as claimed in claim 1, wherein said second chip has a data input stabilization circuit inputting a signal from said input wiring on said second chip, said signal being stabilized and supplied to the first stage of the shift register circuit by said data input stabilization circuit, and a data output circuit inputting a signal from the final stage of said shift register circuit, said signal being stabilized and supplied to said external wiring by said data output circuit, said data output circuit being formed on said substrate.

16. The linear solid-state image sensor as claimed in claim 1, wherein said second chip has a second data input stabilization circuit inputting a signal from said input wiring on said second chip, said signal being stabilized and supplied to the first stage of the shift register circuit by said second data input stabilization circuit, said second data input stabilization circuit being formed on said substrate, and a second data output circuit inputting a signal from the final stage of said shift register circuit, said signal being stabilized and supplied to said external wiring by said second data output circuit, said second data output circuit being formed on said substrate, and said first chip has a first data input stabilization circuit inputting a signal from said external wiring, said signal being stabilized and supplied to the first stage of the shift register circuit by said first data input stabilization circuit, said first data stabilization circuit being formed on said substrate, and a first data output circuit inputting a data from the final stage of said shift register circuit, said signal being stabilized and output by said first data output circuit, said first data output circuit being formed on said substrate.

* * * * *